United States Patent
Doughty

(10) Patent No.: US 8,850,830 B2
(45) Date of Patent: Oct. 7, 2014

(54) TEMPERATURE COMPENSATION SYSTEM AND METHOD

(75) Inventor: Kurt J. Doughty, Berlin, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 177 days.

(21) Appl. No.: 13/494,266

(22) Filed: Jun. 12, 2012

(65) Prior Publication Data

US 2013/0327071 A1 Dec. 12, 2013

(51) Int. Cl.
*F25D 3/12* (2006.01)

(52) U.S. Cl.
USPC .................................... 62/56; 62/114; 62/185

(58) Field of Classification Search
CPC ......... F25D 17/02; F25D 29/00; F25D 27/00; F25B 2309/06; F25B 2341/0681; F25B 1/00; G01M 3/3245
USPC ....................... 62/114, 185, 202, 56, 129, 157
See application file for complete search history.

(56) References Cited

U.S. PATENT DOCUMENTS

| | | | |
|---|---|---|---|
| 4,532,795 A | 8/1985 | Brayman et al. | |
| 4,781,057 A | 11/1988 | Hyfantis, Jr. et al. | |
| 5,007,245 A | 4/1991 | Defenbaugh et al. | |
| 5,499,650 A | 3/1996 | McArthur et al. | |
| 6,168,048 B1 * | 1/2001 | Xu et al. | 222/1 |
| 6,772,598 B1 * | 8/2004 | Rinehart | 62/126 |
| 6,832,504 B1 * | 12/2004 | Birkmann | 73/40 |
| 7,174,772 B2 | 2/2007 | Sacca | |
| 7,178,385 B2 | 2/2007 | McCoy et al. | |
| 7,380,408 B2 | 6/2008 | Zywiak et al. | |
| 7,462,266 B2 * | 12/2008 | Miyata et al. | 204/408 |
| 7,862,773 B2 | 1/2011 | Ibrahim | |
| 8,074,491 B2 | 12/2011 | Martino | |
| 8,171,745 B2 | 5/2012 | Schroder | |
| 2003/0029185 A1 * | 2/2003 | Kopko | 62/271 |
| 2004/0031282 A1 * | 2/2004 | Kopko | 62/271 |
| 2005/0103029 A1 * | 5/2005 | Kawahara et al. | 62/126 |

* cited by examiner

*Primary Examiner* — Mohammad M Ali
(74) *Attorney, Agent, or Firm* — Carlson, Gaskey & Olds, P.C.

(57) ABSTRACT

A cooling system includes a cooling loop that includes a reservoir. The reservoir has a level sensor that is configured to provide a level signal indicative of a coolant level within the reservoir. A temperature sensor is in communication with the cooling loop and is configured to provide a temperature signal. A controller is in communication with the level sensor and the temperature sensor. The controller has a coolant density data. The controller is configured to correct the level signal based upon the temperature signal and detect a leakage condition of the cooling system. A method of determining a coolant amount within a cooling system includes the steps of determining an amount of coolant having a temperature-variable density, determining a coolant temperature, correcting the coolant amount based upon the coolant temperature, and comparing the corrected coolant amount to a desired coolant amount to detect a coolant leakage condition.

20 Claims, 2 Drawing Sheets

TEMPERATURE COMPENSATION SYSTEM AND METHOD

BACKGROUND

This disclosure relates to a temperature compensation system and method for a cooling system used, for example, in an aircraft. In particular, the temperature compensation system relates to detecting leakage in the cooling system.

A closed-loop liquid aircraft cooling system includes a motor-driven pump that circulates coolant through a cooling loop. Some desired coolants may have a density that varies with temperature. As liquid temperatures change throughout the system, the system volume will also change. Typically, the cooling loop includes a reservoir to accommodate thermal expansion and contraction of the coolant, among other things. The volume change is detected by a level sensor within the system reservoir.

SUMMARY

In one example embodiment, a cooling system includes a cooling loop that includes a reservoir. The reservoir has a level sensor that is configured to provide a level signal indicative of a coolant level within the reservoir. A temperature sensor is in communication with the cooling loop and is configured to provide a temperature signal. A controller is in communication with the level sensor and the temperature sensor. The controller has a coolant density data. The controller is configured to correct the level signal based upon the temperature signal and the coolant density data in order to detect a leakage condition of the cooling system.

In another example embodiment, a method of determining a coolant amount within a cooling system includes the steps of determining an amount of coolant having a temperature-variable density, determining a coolant temperature, correcting the coolant amount based upon the coolant temperature, and comparing the corrected coolant amount to a desired coolant amount in order to detect a coolant leakage condition.

BRIEF DESCRIPTION OF THE DRAWINGS

The disclosure can be further understood by reference to the following detailed description when considered in connection with the accompanying drawings wherein.

DETAILED DESCRIPTION

Figure 1:
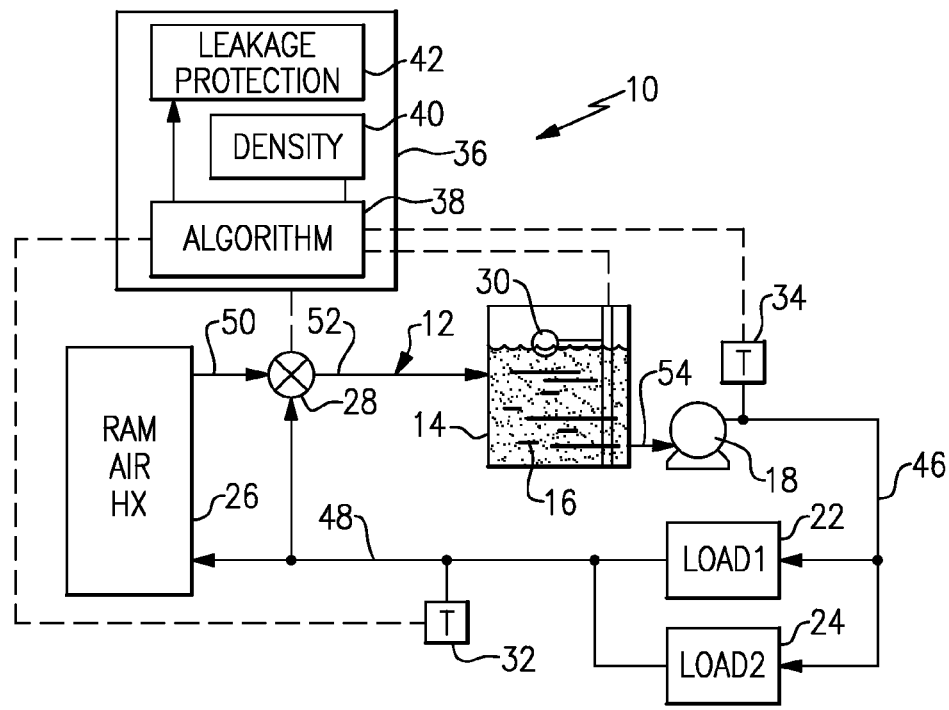
FIG. 1 is a schematic view of an example cooling system having temperature compensation.

FIG. 1 schematically depicts a cooling system, for example, an aircraft refrigeration system 10. The system 10 includes a cooling loop 12 having a reservoir 14 with an amount of coolant. In one example, the coolant is a propylene glycol, such as DOWFROST 60.

A pump 18 circulates the coolant within the coolant loop 12. The coolant flows to first and second heat loads 22, 24, which may correspond to power electronic cooling plates or aircraft galley chillers, for example. The first and second heat loads 22, 24 reject heat to the coolant in the cooling loop 12. The hot coolant flows to a heat exchanger 26, which may be arranged in a ram air duct. The heat exchanger 26 rejects heat from the coolant to the surrounding environment. The cooled coolant is returned to the reservoir 14. A temperature control valve 28 may be provided in the coolant loop 12 to selectively permit coolant to bypass the heat exchanger 26 and maintain the coolant at a higher or lower temperature, if desired. It should be understood that the above cooling loop arrangement is exemplary. There may be more or fewer components than described or the components may be arranged differently.

The reservoir 14 may include a level sensor 30 configured to provide a level signal indicative of a volume of coolant 16 within the reservoir 14. The volume of the coolant 16 may vary based upon the temperature. Thus, although the cooling system 10 may be without leaks, the fluctuating level signal may give the impression that the volume or mass within the cooling system 10 has changed.

An accurate calculation of the amount of fluid, either volume or mass, within the system is needed in order to ensure that the system has enough fluid to operate throughout its full operating envelope (temperature, leak allocation, etc.). This function supports system maintenance. Additionally, it is important to be able to identify if a slow leak exists within the closed-loop system. An accurate calculation of the amount of fluid mass within the system is needed to differentiate whether a decrease in system volume is due to normal thermal contraction or a slow fluid leakage.

It is desirable to accurately determine the amount of coolant within the cooling system 10 for any given operating condition. To this end, a controller 36 communicates with the level sensor 30 and first and second temperature sensors 32, 34. It should be understood that any number of temperature sensors may be used.

In order to ensure that a closed-loop liquid system has sufficient fluid to operate throughout its operating envelope and is able to detect very slow leaks, for example, one drop per second, a temperature compensated liquid level algorithm 38 is provided. The algorithm 38 determines the threshold for detecting slow leaks to prevent nuisance leak detection. Therefore, the more accurate algorithm yields improved capability for slow leak detection. The accuracy of the algorithm 38 is a function of temperature sensor accuracy, level sensor accuracy, temperature sensor location, and temperature variability within the system.

The controller 36 includes the algorithm 38, which receives density data 40. The algorithm 38 corrects the level signal based upon one or more temperature signals from the temperature sensors 32, 34 and provides a leakage detection 42. The corrected level signal adjusts for the changing volume of coolant in the system due to varying temperatures. In one example, the corrected level signal corresponds to the mass of coolant in the system.

The temperature sensors 32, 34 are placed in the system 10 for increased accuracy. In designing the system 10, coolant volume is calculated between system heating and cooling nodes in order to calculate mass as a function of liquid temperature (note: density is a function of temperature) separately for each volume segment. The cooling loop 12 may be analyzed in terms of segments, each segment exposed to a different temperature differential that affects the density of the coolant. In the example in illustrated in FIG. 1, the cooling loop 12 includes first, second, third, fourth, fifth segments 46-54 separated by heating nodes 18, 22, and 24 and cooling node 26. It may be desirable to place the temperature sensors 32, 34 along segments that experiences the most amount of temperature differential throughout a given operating condition, for example, compared to at least half of the segments. In one example, the first and third segments 44, 48 may be desirable locations for the temperature sensors 32, 34.

Worst-case accuracy of the algorithm 38 is determined by comparing the use of the algorithm 38 to all operating conditions, which includes the heat load amounts and aircraft altitude temperatures. The worse-case accuracy is used to bias the algorithm 38 to center the error. In one example analysis, unbiased the minimum total volume error is 5.83 oz. and the maximum total volume error is 13.37 oz. A bias is then added to the algorithm 38 to center the error at +/−9.60 oz., as determined below.

(maximum total volume error−minimum total volume error)/2=bias amount (13.37 oz.−5.83 oz.)/2=3.77 oz.

(maximum total volume error+minimum total volume error)/2=+/−centered error amount (13.37 oz.+5.83 oz.)/2=+/−9.60 oz.

Thermistors may be used as the temperature sensors 32, 34. The thermistor is selected for a given location to provide an accuracy range covering the temperature differential experienced by the system.

Figure 3:
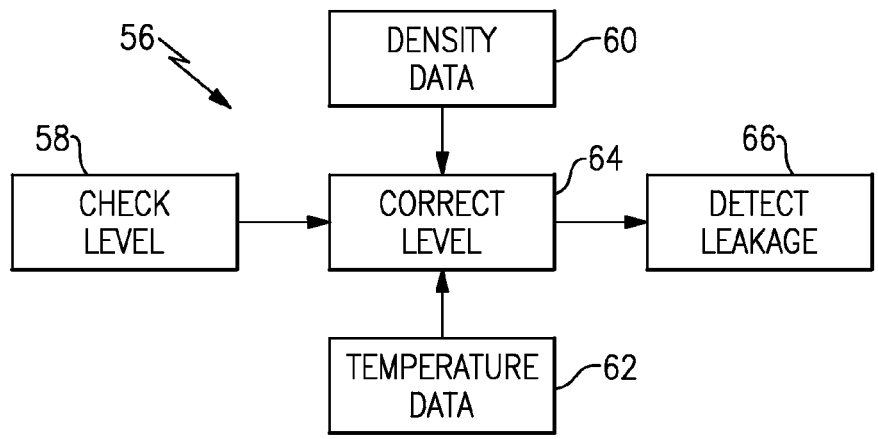
FIG. 3 is a flowchart depicting a temperature compensation method.
Figure 2:
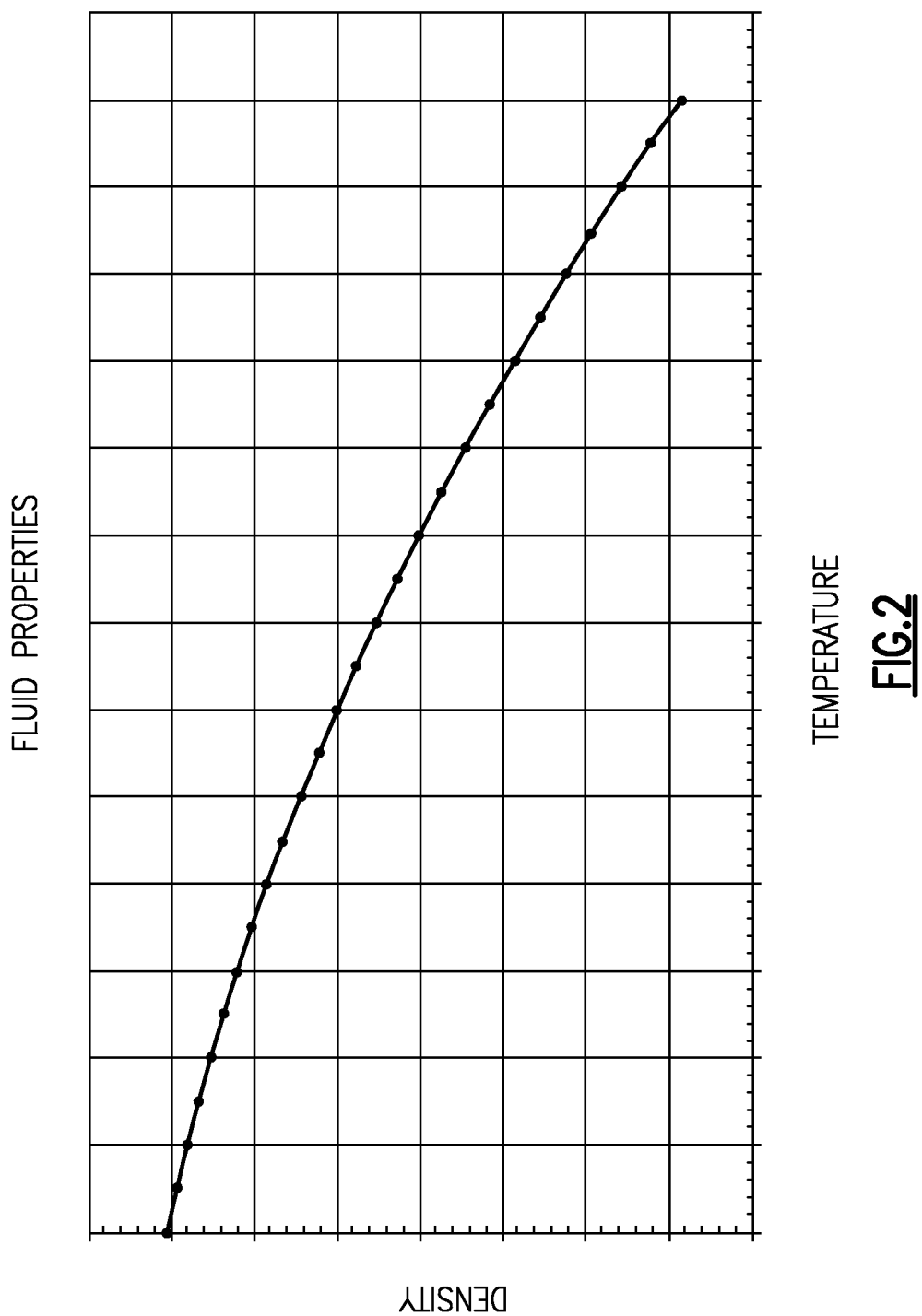
FIG. 2 is a graph depicting a coolant having a temperature-variable density.

Referring to FIG. 3, a method 56 illustrates an example approach for determining a coolant amount within a cooling system. An amount of coolant having a temperature-variable density may be determined, for example, by checking a level of the coolant, as indicated at block 58. A coolant temperature is determined, as indicated at block 62. The determined amount of coolant may be corrected, as indicated at block 64, by referencing the coolant temperature 62 and density data 60. The corrected coolant amount is compared to a desired coolant amount to detect a coolant leakage condition, as indicated at block 66.

It should be noted that the controller 36 may be provided by a computing device used to implement various functionality disclosed in this application. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Although an example embodiment has been disclosed, a worker of ordinary skill in this art would recognize that certain modifications would come within the scope of the claims. For that reason, the following claims should be studied to determine their true scope and content.

What is claimed is:
1. A cooling system comprising:
   a cooling loop including a reservoir, the reservoir having a level sensor configured to provide a level signal indicative of a coolant level within the reservoir;
   a temperature sensor in communication with the cooling loop and configured to provide a temperature signal; and
   a controller in communication with the level sensor and the temperature sensor, the controller having coolant density data, the controller configured to correct the level signal based upon the temperature signal and the coolant density data in order to detect a leakage condition of the cooling system.

2. The system according to claim 1, comprising a heat load in communication with the cooling loop and configured to reject heat to the cooling loop, and a heat exchanger in communication with the cooling loop and configured to reject heat from the cooling loop.

3. The system according to claim 2, wherein the heat load is a power electronics device.

4. The system according to claim 2, wherein the heat load is an aircraft galley chiller.

5. The system according to claim 2, wherein the heat exchanger is a ram air heat exchanger arranged in a ram air duct.

6. The system according to claim 1, wherein the cooling loop includes a propylene glycol coolant.

7. The system according to claim 1, wherein the corrected level signal includes a calculated coolant amount.

8. The system according to claim 7, wherein the controller compares the corrected level signal to a desired coolant amount to detect the leakage condition.

9. A cooling system comprising:
   a cooling loop including a reservoir, the reservoir having a level sensor configured to provide a level signal indicative of a coolant level within the reservoir, wherein the cooling loop includes multiple segments each having a temperature differential throughout various operating conditions;
   a temperature sensor in communication with the cooling loop and configured to provide a temperature signal, the temperature sensor arranged in the segment with a larger temperature differential as compared to at least half of the multiple segments; and
   a controller in communication with the level sensor and the temperature sensor, the controller having coolant density data, the controller configured to correct the level signal based upon the temperature signal and the coolant density data in order to detect a leakage condition of the cooling system.

10. The system according to claim 9, wherein the operating conditions correspond to at least one of a heat load amount and an aircraft altitude temperature.

11. The system according to claim 9, comprising a heat load in communication with the cooling loop and configured to reject heat to the cooling loop, and a heat exchanger in communication with the cooling loop and configured to reject heat from the cooling loop, wherein the heat load is a power electronics device.

12. The system according to claim 9, wherein the heat load is an aircraft galley chiller.

13. The system according to claim 9, wherein the heat exchanger is a ram air heat exchanger arranged in a ram air duct.

14. The system according to claim 9, wherein the cooling loop includes a propylene glycol coolant.

15. The system according to claim 9, wherein the corrected level signal includes a calculated coolant amount, wherein the controller compares the corrected level signal to a desired coolant amount to detect the leakage condition.

16. A method of determining a coolant amount within a cooling system comprising the steps of:
    determining an amount of coolant having a temperature-variable density;
    determining a coolant temperature;
    correcting the coolant amount based upon the coolant temperature; and
    comparing the corrected coolant amount to a desired coolant amount in order to detect a coolant leakage condition.

17. The method according to claim 16, wherein the coolant amount determining step includes determining a coolant level within the reservoir.

18. The method according to claim 17, wherein the corrected coolant amount includes a calculated coolant amount.

19. The method according to claim 17, wherein the coolant is propylene glycol.

20. A method of determining a coolant amount within a cooling system that includes a coolant loop with multiple segments each having a temperature differential throughout various operating conditions, the method comprising the steps of:
    determining an amount of coolant having a temperature-variable density;
    determining a coolant temperature at the segment with a larger temperature differential as compared to at least half of the multiple segments;
    correcting the coolant amount based upon the coolant temperature; and
    comparing the corrected coolant amount to a desired coolant amount in order to detect a coolant leakage condition.

* * * * *